United States Patent [19]  [11] Patent Number: 4,557,962
Belmonte et al.  [45] Date of Patent: Dec. 10, 1985

[54] MASKING APPARATUS FOR SELECTIVELY CHARGING HONEYCOMB STRUCTURES

[75] Inventors: James A. Belmonte, Corning; Arthur E. Hillman, Campbell, both of N.Y.

[73] Assignee: Corning Glass Works, Corning, N.Y.

[21] Appl. No.: 535,240

[22] Filed: Sep. 23, 1983

Related U.S. Application Data

[62] Division of Ser. No. 295,610, Aug. 24, 1981, Pat. No. 4,427,728.

[51] Int. Cl.$^4$ ................................................ B32B 3/12
[52] U.S. Cl. ..................................... 428/117; 156/293; 264/267; 428/188; 428/542.8
[58] Field of Search ............... 428/117, 188, 116, 118, 428/137, 172, 542.8; 55/523, DIG. 3, DIG. 5; 156/293; 264/267

[56] References Cited

U.S. PATENT DOCUMENTS

| | | | |
|---|---|---|---|
| Re. 31,405 | 10/1983 | Paisley | 428/116 X |
| 2,810,672 | 10/1957 | Taylor | 428/138 |
| 4,041,591 | 8/1977 | Noll et al. | 428/117 X |
| 4,276,071 | 6/1981 | Outland | 428/116 X |
| 4,293,357 | 10/1981 | Higuchi et al. | 428/116 X |
| 4,297,140 | 10/1981 | Paisley | 428/116 X |
| 4,329,162 | 5/1982 | Pitcher | 55/523 |
| 4,340,403 | 7/1982 | Higuchi et al. | 428/117 X |
| 4,403,008 | 9/1983 | Factor | 428/117 |
| 4,411,856 | 10/1983 | Montierth | 428/117 X |
| 4,427,728 | 1/1984 | Belmonte et al. | 428/117 |
| 4,455,180 | 6/1984 | Hillman et al. | 428/117 X |
| 4,519,820 | 5/1985 | Oyobe et al. | 55/523 X |

Primary Examiner—Henry F. Epstein
Attorney, Agent, or Firm—R. N. Wardell

[57] ABSTRACT

Improved masking apparatus and methods for bulk charging a flowable material into selected cell ends exposed at an end face of a honeycomb structure. The masking apparatus utilize protrusions which assist in properly aligning the apparatus to the end face and reduce the possibility of improperly charging cells. In one apparatus embodiment, a planar body is provided having a plurality of hollow protrusions which extend into selected cell ends when the planar body is fitted against an end face of the structure. A flowable material charged against the planar body passes through the hollow protrusions into the selected cell ends. In another embodiment, a plurality of preformed protrusions or plugs are mounted along thin, flexible members at predetermined locations. The plugs are removably inserted into and temporarily block or cover the ends of an equal plurality of cells. A flowable material charged against the end face passes into the remaining, uncovered cells. The invention is of particular use in fabricating solid particulate filter bodies from ceramic-based honeycomb structures.

2 Claims, 13 Drawing Figures

MASKING APPARATUS FOR SELECTIVELY CHARGING HONEYCOMB STRUCTURES

This application is a division of application Ser. No. 295,610, filed Aug. 24, 1981, now U.S. Pat. No. 4,427,728.

BACKGROUND OF THE INVENTION

This invention relates to charging flowable materials into selected cells of a honeycomb structure and, more particularly, to methods and related apparatus for selectively manifolding (i.e. plugging) cells of a honeycomb structure for the fabrication of filter bodies and other selectively selected honeycomb structures.

Honeycomb structures having transverse, cross-sectional cellular densities of one-tenth to one hundred or more cells per square centimeter, especially when formed from ceramic materials, have several uses, such as solid particulate filter bodies and stationary ;heat exchangers, which may require selected cells of the structure to be closed or blocked by manifolding or other means at one or both of their ends.

A solid particulate filter body may be fabricated utilizing a honeycomb structure having a matrix of intersecting, thin, porous walls which extend across and between two of its opposing open end faces and form a large number of adjoining hollow passages or cells which also extend between and are open at the end faces. To form a filter, one end of each of the cells is closed, a first subset of cells being closed at one end face and the remaining cells at the remaining end face, so that either may be used as the inlet or outlet end of the filter. A contaminated fluid is brought under pressure to one face (i.e. the "inlet" face) and enters the filter bodies via the cells which are open at the inlet face (i.e. the "inlet" cells). Because the inlet cells are sealed at the remaining (i.e. "outlet") end face of the body, the contaminated fluid is forced through the thin, porous walls into adjoining cells which are sealed at the inlet face and open at the opposing "outlet" end face of the filter body (i.e. "outlet" cells). The solid particulate contaminant in the fluid which is too large to pass through the porous openings in the walls is left behind and a cleansed fluid exits the outlet face of the filter body through the outlet cells for use.

Rodney Frost and Irwin Lachman describe and claim in a commonly assigned copending application Ser. No. 165,646, filed July 3, 1980 and entitled Filter and Related Apparatus, a most efficient solid particulate filter body formed from a honeycomb structure in which the cells are provided in transverse, cross-sectional densities between approximately one and one hundred cells per square centimeter with transverse, cross-sectional geometries having no internal angles less than thirty degrees, such as squares, rectangles, equilateral and certain other triangles, circles, certain elipses, etc. The cells are also arranged in mutually parallel rows and/or columns. Alternate cells at one end face are filled in a checkered or checkerboard pattern and the remaining alternate cells are filled at the remaining end face of the structure in a reversed pattern. Thus formed, either end face of the filter body may be used as its inlet or outlet face and each inlet cell shares common walls with only adjoining outlet cells, and vice versa. Other cellular cross-sectional geometries and other patterns of sealed cells may be employed to fabricate effective, although perhaps less efficient filter bodies than those of Frost and Lachman.

For the mass production of such filters, it is highly desirable to be able to block selected cell ends as rapidly and as inexpensively as possible. The previously referred to application Ser. No. 165,646 describes fabricating filter bodies by plugging the end of each cell individually with a hand-held, single nozzle, air actuated sealing gun. The hand plugging of individual cells by this process is long and tedious and is not suited for the commercial production of such filters which may have thousands of cells to be selectively sealed. The application Ser. No. 165,646 also postulates the use of a sealing gun mounting an array of sealant nozzles so that the plugging mixture may be simultaneously injected into a plurality or all of the alternate cells at each end face of the honeycomb structure. However, a working model of this device is not known to exist for plugging honeycomb structures having the higher cell densities referred to.

An alternative approach to manifolding selected cells at an end face of a honeycomb structure is described and claimed by Rodney Frost and Robert Paisley in another commonly assigned copending application Ser. No. 283,733, filed July 15, 1981 andentitled Method and Apparatus for Selectively Charging Honeycomb Structures, in which an open surface of a honeycomb structure is covered by a mask having a number of openings extending through it. Plugging material is charged against the outer surface of the mask and through its openings into the proximal open ends of cells opposite the openings. Frost and Paisley specifically describe the use of a rigid plate having a plurality of bores extending through it which are spaced and sized to coincide with the open ends of the selected cells at the end face of a honeycomb structure when the plate is positioned against the end face in alignment with its bores opposite the selected cells. Successful use of such an apparatus is dependent upon the ability to provide honeycomb structures having end faces conforming to the face of the masking apparatus so as to prevent gaps therebetween which would allow the sealing material to charge into adjoining cells and to provide predetermined, undistorted positioning of the cells at the end face of the honeycomb structure for accurate registration of the selected cells with the openings in the mask, again, to prevent possible charging of sealing material into adjoining cells.

In a related area, U.S. Pat. No. 4,041,591 describes alternate methods of fabricating a multiple flow path body such as a stationary heat exchanger in which a honeycomb structure is provided having its cells arranged in columns across its open end faces, an open end face of a honeycomb structure is dipped into a flowable resist material and the resist material removed from selected columns by cutting it away together with the common walls of the adjoining cells in the selected column or, alternatively, the walls between the adjoining cells of the selected columns are cut away at the open end face of the structure before dipping the end face into the flowable resist material, then the resist material is blown from the selected columns using compressed air directed down the selected columns where the adjoining cell walls have been removed. The end face was thereafter dipped into a slurry of cement to form a sealed channel across each of the selected columns. The remaining flowable resist material was subsequently removed by heating. Although these methods do not involve charging a permanent plugging material into cells as the purpose is to create channels across the ends of cells, sufficient plugging material could be provided to block the cell ends exposed by the cutting step. As the cross-sectional density of cells in the honeycomb structure is increased, for example to improve the efficiency of a filter body, the tolerances needed for the removal of adjoining cell walls required by these methods tighten. The problem is particularly heightened when the filter bodies are fabricated from extruded ceramic or ceramic-based honeycomb structures as the present state of the ceramic extrusion art cannot provide perfectly parallel rows and/or columns of cells. Also, these methods requires the partial destruction of adjoining cell walls and are entirely unsuited for the fabrication of filter bodies or other selectively sealed honeycomb structures where the cells are plugged in a checkered or other possible alternating cell pattern at the end faces.

SUMMARY OF THE INVENTION

It is an object of the invention to provide a method for selectively bulk charging cells of a honeycomb structure with a flowable material which is compatible with any desired pattern of cells selected to be charged.

It is yet another object of the invention to minimize the overspill of sealing material when bulk charging selected cells of a honeycomb structure.

It is yet another object of the invention to provide a method of selectively manifolding large numbers of cells of honeycomb structures that is more rapid and less expensive than hand filling individual cell ends.

These and other objects are accomplished by providing masking apparatus comprising at least one base member having a plurality of protrusions extending therefrom which can be registered with and inserted into the open ends of a subset of the cells at an open end face of a honeycomb structure. According to one aspect of the invention, a flowable material may be channeled into selected cells through hollow protrusions inserted into the ends of the selected cells, minimizing the likelihood of overspill into adjoining cells not to be charged. In one embodiment, a rigid member is provided with a plurality of hollow tubes extending through it and protruding from one of its outer surfaces. The tubes are positioned with respect to one another across the member and sized so as to coincide with and extend into the ends of selected cells of a honeycomb structure when the member is fitted against an end face of the structure. A flowable material charged against the opposing outer face of the member which coverably seals the open ends of all but the subset of selected cells and passes through the hollow protrusions and into all of the selected cells. According to another aspect of the invention, a flowable material may be charged into a selected subset of cells at an open end face of a honeycomb structure by blocking the ends of the remaining cells with an equal plurality of preformed protrusions or plugs. A flowable material then charged into the end face of the structure passes into the unblocked cells. In an embodiment of this aspect of the invention, selected cells of a honeycomb structrure are temporarily blocked at one of the structure's open end faces by suitable preformed plugs, such as capped rivets, which are inserted into the ends of the cells not to be charged and coverably seal the ends of these cells. A flowable material charged against the end face of the structure passes into all of the uncovered cell ends. The plugs are transversely affixed to thin, elongated members, such as wires, at predetermnined intervals for ease of use. Either embodiment may be used to fabricate solid particulate filter bodies from porous walled, honeycomb structures or to fabricate other selectively plugged honeycomb bodies from porous or non-porous honeycomb structures.

DESCRIPTION OF THE DRAWINGS

The various aspects of the invention are better understood with reference to the accompanying drawings, in which.

DETAILED DESCRIPTION OF THE INVENTION

Figure 1:
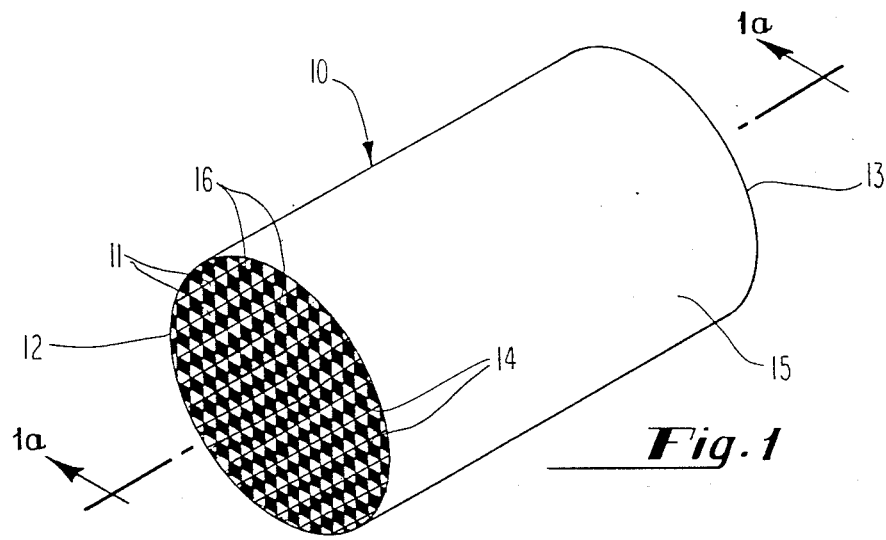
FIGS. 1 and 1a depict a solid particulate filter body fabricated using the inventive methods and apparatus.

A preferred use of each of the embodiments of the present invention is the fabrication of solid particulate filter bodies as are described by Frost and Lachman in aforesaid copending application Ser. No. 165,646 which is incorporated in its entirety by reference herein. An exemplary preferred filter body of that invention is depicted in FIG. 1 and in a cross-sectioned view along the line 1a—1a in FIG. 1a. The filter body comprises a honeycomb structure 10 having a multiplicity of hollow, open ended passages or cells 11 which typically extend in an essentially mutually parallel fashion through the structure 10 so as to reduce back pressure in the filter body being fabricated. The ends of the cells 11 are open at and form a pair of substantially identical open outer surfaces at end faces 12 and 13 of the structure. The cells 11 are themselves formed by a matrix of intersecting walls 14 which extend between each of the end faces 12 and 13. For filter body applications, the walls 14 are porous nd continuous across the end faces 12 and 13 and preferably uniformly thin, although walls of non-uniform thickness may be used with less efficiency. A thicker, outer "skin" 15 may be be provided around the cells 11 and thin walls 14 between the end faces 12 and 13.

Figure 1A:
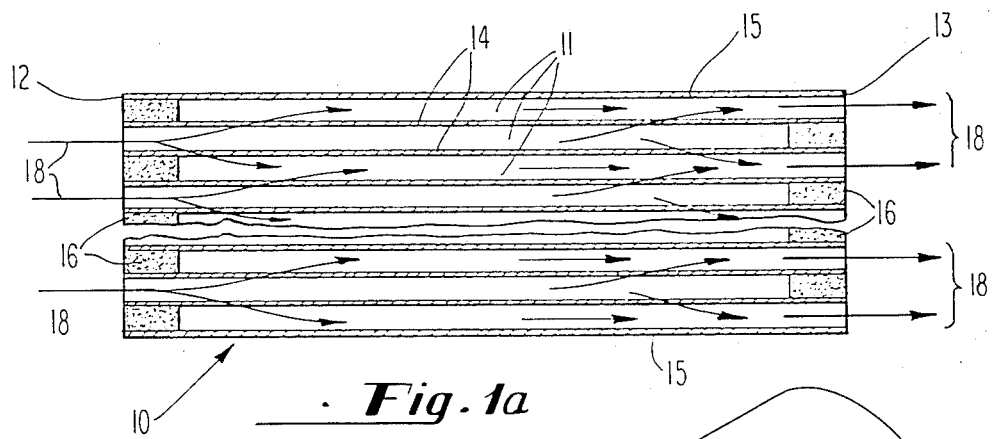

Honeycomb structures for solid particulate filtering and other applications may be formed from a variety of porous materials including ceramics, glass-ceramics, glasses, metals, cermets, resins or organic polymers, papers, or textile fabrics (with or without fillers, etc.), and various combinations thereof and by variety of methods depending upon the material (s) selected. Honeycomb structures having the necessary uniformly thin, porous and interconnected walls for solid particulate filtering applications are preferably fabricated from plastically formable and sinterable, finely divided particles and/or short length fibers of substances that yield a porous, sintered material after being fired to affect their sintering, especially metallic powders, ceramics, glass-ceramics, cermets, and other ceramic-bases mixtures. An extruded ceramic honeycomb structure having cordierite as its primary crystal phase, which is preferred for moderately high temperature solid particulate filtering applications (1,000° Centigrade or more) due to its low thermal expansion characteristics, may be provided in the manner described in the aforementioned Frost and Lachman application Ser. no. 165,646. Several exemmplary raw material mixtures are described therein which yield honeycomb structures with thin walls having various open porosities. The filter body is formed by plugging, covering or otherwise blocking the ends of a subset of alternative cells at one end face of the structure and the remaining cells at the remaining end face of the structure. In FIGS. 1 and 1a, alternate cells 11 of the honeycomb structure 10 have been blocked with plugs 16 at either end face in a checked or checkerboard pattern described and claimed in the aforesaid application Ser. No. 165,646. The plugging pattern on the end face 13 (hidden in FIG. 1) is the reverse of that depicted on the end face 12. Further information regarding the use and operation of the described filter bodies is provided in the aforesaid application Ser. No. 165,646. The plugs 16 are selected from a material compatible with the composition of the honeycomb structure and its ultimate use as a filter body. Where the aforesaid cordierite structures are used for filtering applications, cordierite cement plugs 16 are preferably provided for compatibility. Suitable foaming cordierite cements are described and claimed in application Ser. No. 165,647filed July 3, 1980 and entitled Ceramic Foam Cement, which is now U.S. Pat. No. Re 31,405 and incorporated by by reference herein. A particular composition of that cement preferred for high sodium ion exhaust gas filtering applications is provided in the aforesaid application Ser. No. 165,646. Non-foaming cordierite cement compositions which may be used with the porous walled cordierite substrates identified in the application Ser. No. 165,646 are identified in yet another copending application Ser. No. 295,612 filed Aug. 24, 1981 entitled Selectively Plugged Sinterable Honeycomb Structures, now U.S. Pat. No. 4,455,180 which is incorporated by reference herein. Alternatively, other ceramic cements and other plugging materials may be used with cordierite or other honeycomb structures to fabricate filter bodies and other selectively plugged honeycomb structures using the subject invention which is hereinafter described in three embodiments, including a preferred embodiment, in the context of fabricating the described solid particulate filter bodies.

FIRST EMBODIMENT

Figure 2:
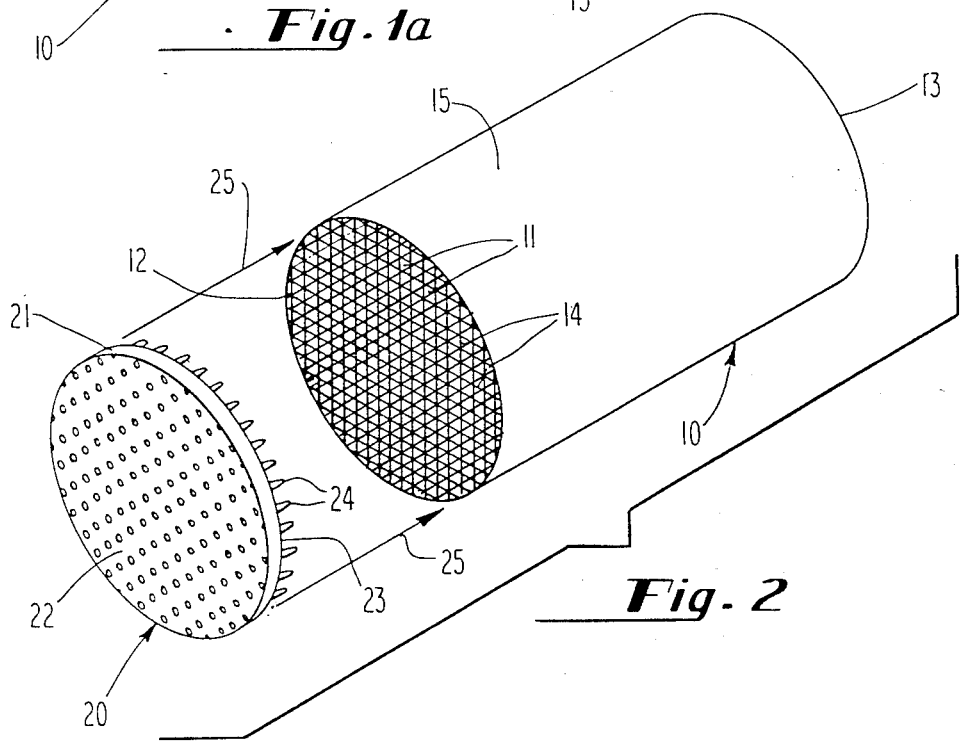
FIG. 2 depicts a honeycomb structure and first mask embodiment.
Figure 4:
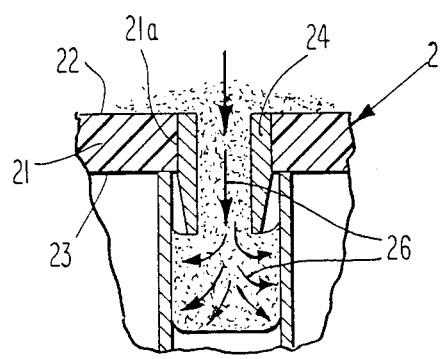
FIG. 4 depicts a flowable material being charged through one of the hollow protrusions of the mask embodiment of FIGS. 2 and 3 into a cell of the honeycomb structure.
Figure 3:
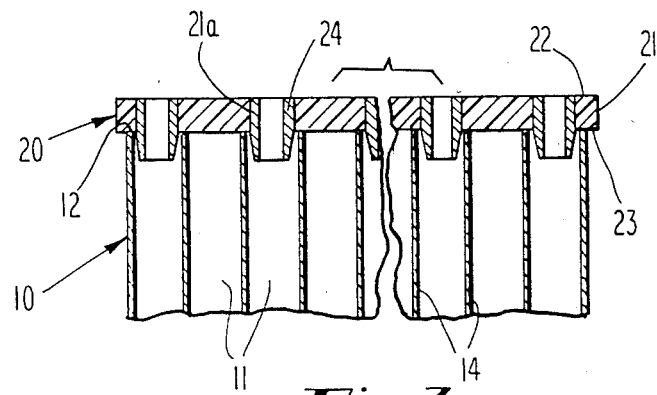
FIG. 3 depicts in a sectioned, profile view, the mask embodiment of FIG. 2 fitted to the honeycomb structure.

FIG. 2 depicts a honeycomb structure 10 again having cells 11 formed by thin walls 14 extending between end faces 12 and 13 with a first embodiment mask 20 of the subject invention. The mask 20 comprises a rigid, essentially plate-like body 21 having opposing upstream and downstream faces 22 and 23. The body 21, as shown in FIGS. 3 and 4, has a plurality of bores 21a extending axially between its surfaces 22 and 23 each of which is fitted with a hollow tube 24 which protrudes like a nipple from the downstream surface 23 of the mask body 21. The mask 20 is used by positioning its downstream face 23 against an end facae 12 (or 13) of the structure 10 as indicated by the arrows 25 in FIG. 2, preferably until the downstream surface 23 is substantially flush with the end face 12 (or 13) as is depicted in FIG. 3. The tubes 24 are positioned with respect to one another across the mask body 21 and sized so as to coincide with and extend into the ends of selected cells when the mask 20 is fitted to the end face 12 (or 13) of the structure 10. A suitably flowable material (indicated by shading in FIG. 4), such as one of the aforesaid ceramic plugging cements, which is charged against the upstream face 22 of the mask 20 under pressure, passes through the tubes 24, as is indicated by the arrows 26 in FIG. 4, into the ends of the selected cells into which each tube 24 extends. Desirably, the outer surface of protruding nipples of tubes 24 taper inwardly as they extend from the plate-like body 21 so as to present a smaller transverse cross-sectional area at their tip for easier registration with the open cell ends. The base of the nipples may be sufficiently wide so as to rest on or fit snugly into the ends of the selected cells 11 to prevent the flowable plugging material from spilling or oozing over into adjacent cells which are to remain open or unplugged. The mask 20 may be made from metal components by assembly, in the manner described, or monolithically by such methods as casting, or alternatively, from other formable or machinable rigid materials. It is also envisioned that the mask may be formed monolithically from a flexible or elastic polymer material in a manner similar to the preferred embodiment subsequently described herein.

Figure 5:
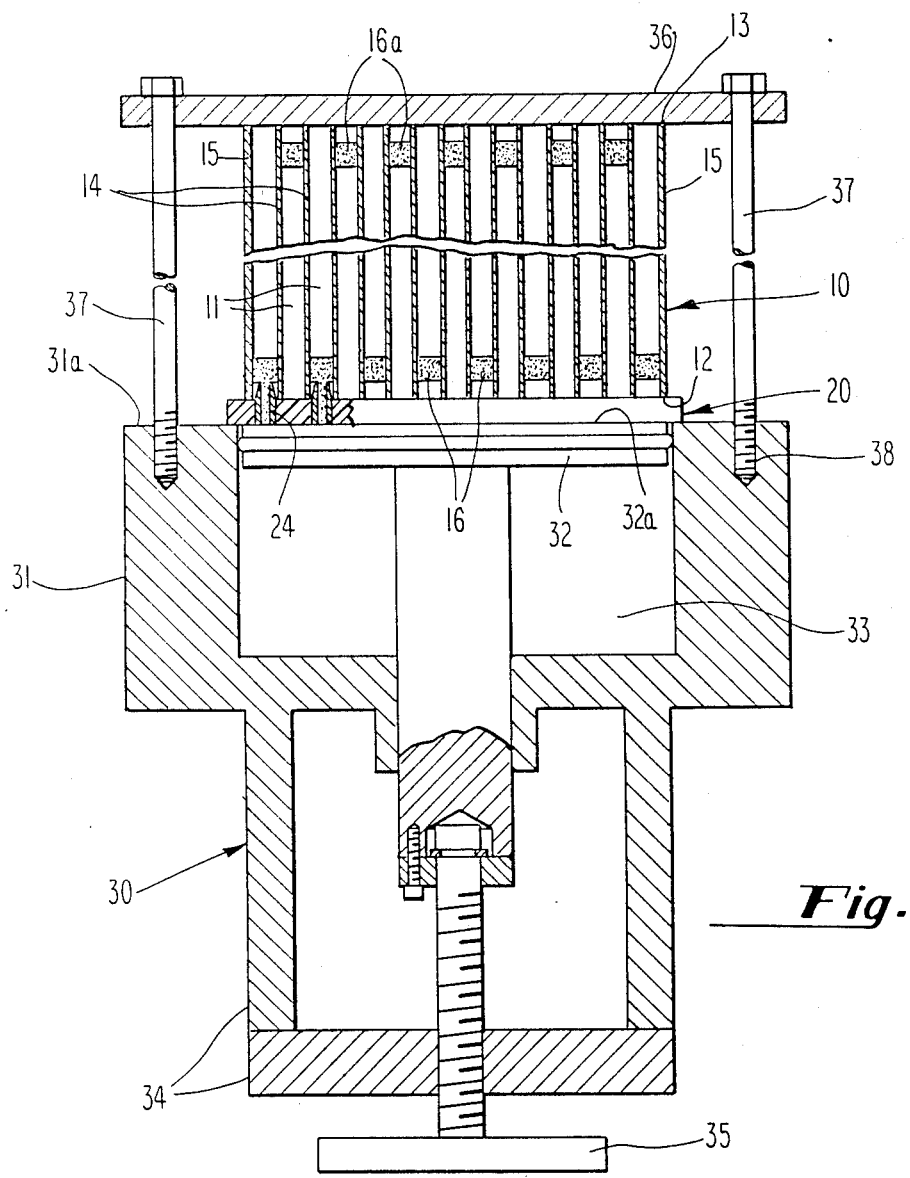
FIG. 5 depicts a press apparatus for using the several mask embodiments of FIGS. 2 through 4 and 6 through 7b.

FIG. 5 depicts an exemplary press apparatus 30 which may be used with the first embodiment mask 20 to charge a plastically formable cement or other viscous material into selected cell ends of a honeycomb structure. The apparatus 30 comprises a press held 31 housing a piston 32 traveling in a bore 33 which is open at an outer surface 31a of the head 31 and additional frame members 34 supporting a hand-operated screw 35 or other suitable means for moving the piston 32 in the bore 33. A honeycomb structure 10 is charged using the mask embodiment 20 and the subject press apparatus 30 by withdrawing the piston 32 into the chamber 33 forming a cavity between its head 32a and the outer surface 31a of the press head 31. The ceramic cement or other material to be charged into the structure 10 is loaded into the cavity. The honeycomb structure 10 with fitted mask 20 is applied over the bore 33 and against the surface 31a of the press head. The structure 10 and mask 20 are held in position by suitable means such as a bar 36 positioned over the opposing end face 13 of the structure, which bar is held in position by suitable means such as threaded bolts 37 extending into suitably threaded bores 38 in the press head 31. The piston 32 is then advanced towards the mask 20 by means of the screw 35 and presses the material in the cavity through the tubes 24 into the proximal ends of the cells 11 forming plugs 16. Plugs 16a have been formed in the remaining alternate cells of the structure 10 at the opposite end face 13 in a similar, previous filling operation. The structure 10 is then removed from the press head and the plugs 16 and 16a fixed in position by sintering in the case of the aforesaid cordierite cements or by drying, curing or other appropriate steps for other plugging materials.

SECOND EMBODIMENT

Figure 6:
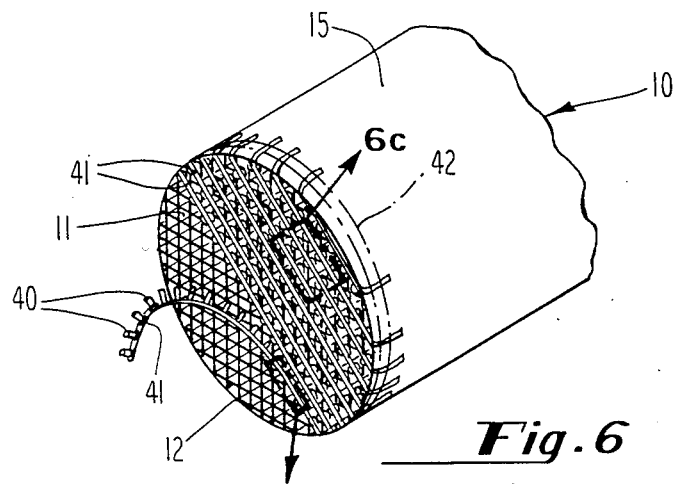
FIG. 6 depicts a second mask embodiment of the invention being fitted to an end face of a honeycomb.
Figure 6A:
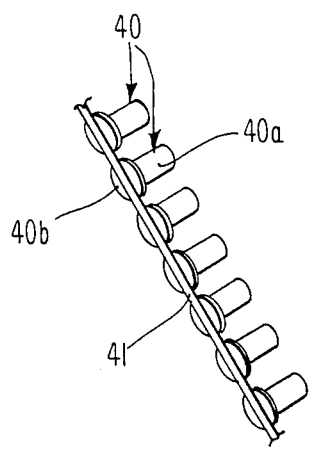
FIG. 6a depicts a thin flexible member and preformed plugs of FIG. 6 in an expanded view.
Figure 6B:
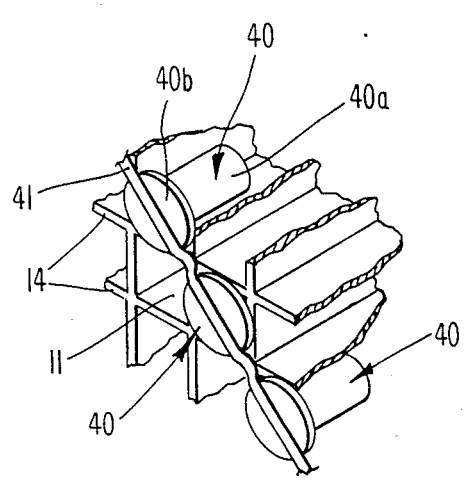
FIG. 6b is an expanded, sectioned, view of area 6b of FIG. 6 depicting the covering of the open ends of some of the cells by individual plug members and their protrusion into the cell ends.
Figure 6C:
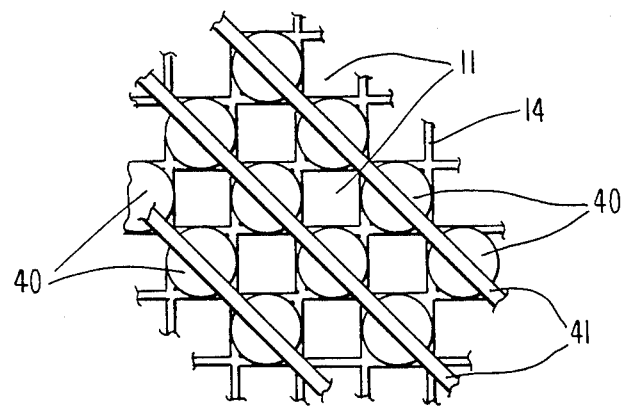
FIG. 6c is an expanded end view of the area 6c of FIG. 6 showing the arrangement of plug elements in alternate cells of the honeycomb structure exposing the remaining cells in the checkered pattern for filling.

FIGS. 6 through 6c depict a second embodiment of the invention comprising a multiplicity of preformed plug elements 40, each of which is inserted into and blocks or covers the open end of a cell 11 at an end face 12 (or 13) of a honeycomb structure 10. For convenience, the plugging elements 40 are preferably prepositioned along elongated members 41, such as flexible wires, which are sufficiently thin (i.e. of width perpendicular to the axes of members 40 smaller than width of cells) so as to not overlap or substantially block cells adjoining those temporarily plugged with the members 40. The flexible members 41 assist considerably the use of the plug elements 40. The flexibility of the members 41 allows some latitude in aligning the plug elements 40 with distorted arrangements of cells at an end face. The members 41 also locate the plug elements 40 in the vicinity of the appropriate cell ends during insertion and provide a means for quickly removing the plugs after the selected cells of the structure have been charged. Each element 40 has a central body portion 40a which is sufficiently small in diameter so as to be inserted into an open end of a cell 11. Additionally, each plug element 40 is provided with a larger head portion 40b having a diameter greater than the minimum diameter or width of the open, transverse, cross-sectional areas of the cells. Head portion 40b both covers the cell ends preventing their charging and prevents the plugs 40 from being pushed completely past the end face into a cell end during the charging process. To plug alternate cells 11 arranged in rows and columns at an end face 12 of a honeycomb structure in the aforementioned checkered or checkerboard pattern, flexible elements 41 each carrying one or more plug elements 40 are arranged along alternate, parallel diagonals of cells at an end face, as indicated in FIG. 6c. The plug elements 40 may be inserted into the cells along the remaining alternate diagonals at the opposing end face of the structure 10 to achieve the desired, reversed, checkered or checkerboard plugging pattern. The flexible members 41 may be provided sufficiently long so as to overlap the sidewalls 15 of the structure 10 where they may be held in place by suitable means 42 for the charging methods selected. For example, the press apparatus 30 of FIG. 5 may be used by stretch-fitting an oversized collar, such as an annular, hollow neoprene ring having an inner circumference slightly less than the outer circumference of the end face 12, over the end face 12 and onto the structure sidewalls 15 and ends of the flexible members 41. Alternatively, an adjustable clamp, tape or other means may be used to secure the ends of the flexible members 41 to the sides 15 of the structure 10. A working model of the masking apparatus depicted was fabricated by soldering small, copper rivets at predetermined locations along thin, copper wires. Although the depicted arrangement of the flexible members 41 along diagonals of cells arranged in rows and columns is preferred for the fabrication of solid particulate filter bodies having the preferred checked plugging pattern depicted in FIG. 1, it is envisioned that other plugging patterns can be achieved by other spacings of the plugging elements 40 along the flexible members 41 and other orientations of the members 41 across an open end face of a honeycomb structure 10.

PREFERRED EMBODIMENT

Figure 7:
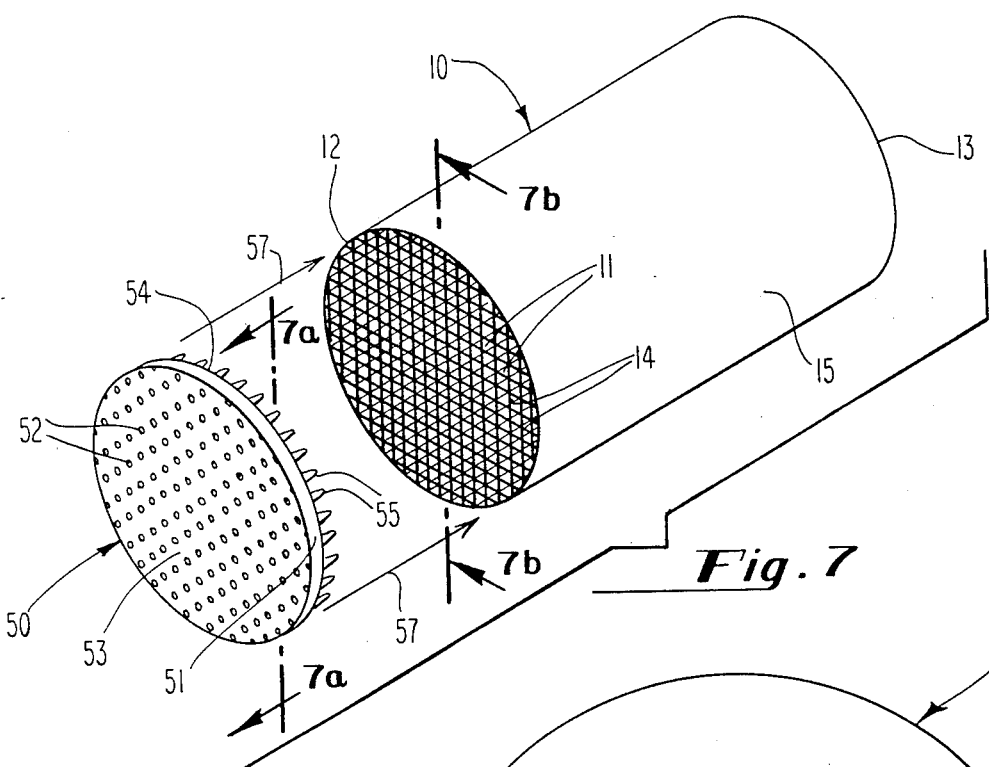
FIG. 7 depicts a preferred embodiment of the invention, an elastic mask, and a honeycomb structure with which it is used.
Figure 7A:
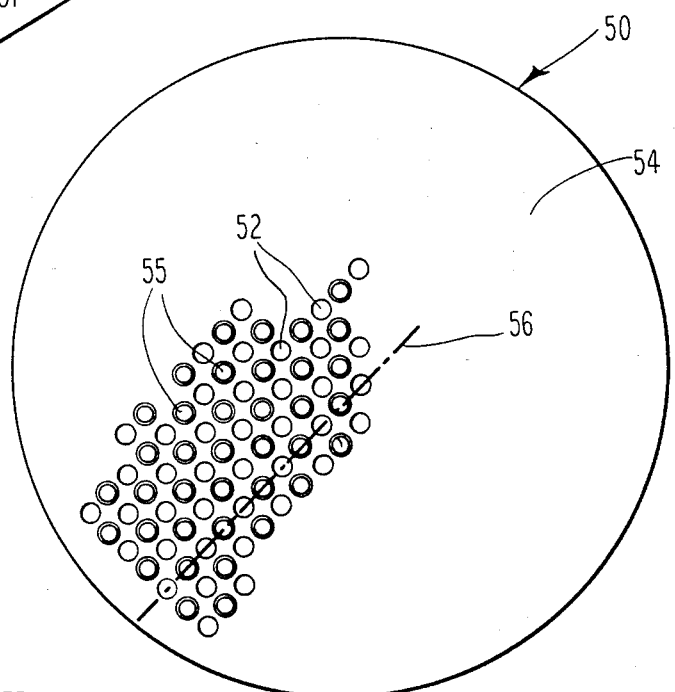
FIG. 7a is a view of the downstream face of the mask embodiment of FIG. 7 along the lines 7a—7a depicting the relative positioning of some of its protrusions and openings.
Figure 7B:
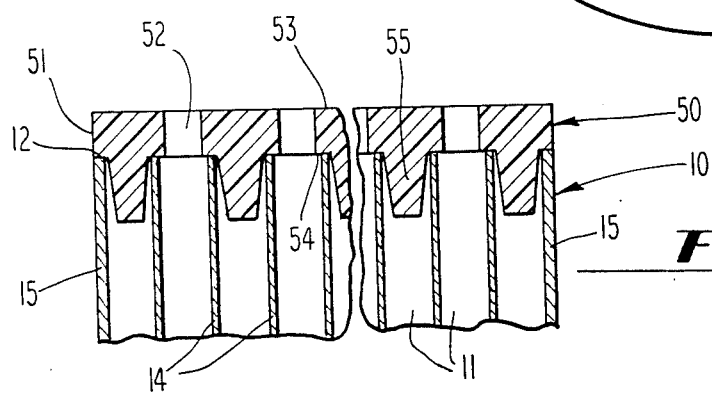
FIG. 7b depicts in a cross-section profile view along the lines 7b—7b of FIG. 7, the preferred mask embodiment fitted to the honeycomb structure.

An embodiment of the invention which is preferred for fabricating solid particulate filter bodies or for otherwise charging flowable materials into selected cells of honeycomb structures, in which the open ends of the cells or the arrangement of the cells across the end face may be somewhat distorted, is an elastic mask described and claimed in a copending application Ser. No. 283,734, filed July 15, 1981 and entitled Method and Apparatus for High Speed Manifolding of Honeycomb Structures, now U.S. Pat. No. 4,411,856, which is incorporated by reference herein. An exemplary elastic mask 50 is depicted in FIGS. 7 through 7b together with an exemplary honeycomb structure 10 with which it is used. The mask 50 consists of a substantially plate-like body section 51 having a plurality of openings 52 extending substantially axially therethrough between an upstream face 53 and downstream face 54. A second plurality of protrusions 55 is also provided extending in a substantially axial direction from the downstream face 54. The openings 52 and protrusions 55 are spaced with respect to one another and sized so as to coincide with selected cells 11 when the mask is fitted to an end face 12 (or 13) of the structure 10. A portion of the openings 52 and protrusions 55 are depicted in FIG. 7a in view of the downstream face 54 of the mask 50. The openings 52 and protrusions 55 are alternated with one another along rows and columns parallel and perpendicular, respectively, to the line 56 of FIG. 7a so as to coincide with alternate cells arranged in rows and columns, respectively, at the end face 12 (or 13) of the structure 10. The mask 50 is fitted to the end face 12 (or 13) of the structure 10, as indicated by the arrows 57 in FIG. 7, with the downstream face 54 flush against the ends of the cells 11, as depicted in FIG. 7b. Preferably, the protrusions 55 are also elastic and taper as they extend away from the downstream face 54 from a cross-sectional diameter equal to or greater than a cross-sectional diameter less than the minimum diameter of the open, cross-sectional area of the cell ends into which they protrude. The protrusions 55 assist in aligning the mask to the end face with its openings opposite the proper cell ends and temporarily block the cell ends into which they are inserted preventing the plugging or other flowable material being charged through the mask 50 from entering those cells. A more detailed description of the fabrication and use of the mask 50 is provided in the aforesaid application Ser. No. 283,734. A preferred embodiment for fitting the mask 50 to an end face of a honeycomb structure is provided in yet another co-pending application Ser. No. 283,735 filed July 15, 1981, entitled Method and Apparatus for Aligning Body with Honeycomb Structure, which is assigned to the assignee of this application and is incorporated by reference herein.

It will be appreciated that the described embodiments. are exemplary and that variations and modifications may be made with respect to each. For example, although the first embodiment of FIGS. 2 through 4 was depicted in FIG. 5 with a press apparatus for charging a plastically formable or other highly viscous material into selected cell ends, it is envisioned that the apparatus 20 may be used to charge less viscous materials such as a plugging cement slurry into selected cell ends. One way to accomplish this would be to position the honeycomb structure on its side with its end faces 12 and 13 in a vertical orientation. The apparatus 20 is fitted to an end face in the manner described with its hollow tubes extending into the selected cell ends. A cement slurry is charged against the upstream face 22 of the mask and injected through the hollow tubes 24 into the cell ends 11 while the mask 20 is slowly withdrawn from the end face 12 of the structure 10. The mask 20 would be withdrawn at the rate at about which the slurry is being deposited into the cell ends. The flow of slurry would be halted just before the hollow tubes 24 clear the end face of the structure 10. The structure 10 may be rolled or vibrated to assure distribution of the slurry across the cell end. Also, in accordance with Montierth's teaching in the aforesaid application Ser. No. 283,734, the plugs 40 of the second embodiment depicted in FIGS. 6 through 6c may be made of a flexible or elastic material and in a tapered configuration similar to the protrusions 55 of the mask embodiment of FIGS. 7 through 7b so as to conform to or temporarily seal the cell ends into which they are inserted.

While particular embodiments of the present invention have been shown and described and some modifications suggested, it will be appreciated that other modifications of the invention, not specifically mentioned, will occur to those skilled in the art and are intended to be included within the scope of the invention which is described in the appended claims.

What is claimed:

1. The combination comprising:
   a honeycomb structure having a pair of opposing open end faces and a matrix of thin walls defining a multiplicity of hollow, open ended cells extending through said structure between said pair of end faces, including a selected subset of said cells, and
   a plurality of preformed plugs for use in bulk charging a flowable material into said selected subset of cells, each of said preformed plugs removably inserted into and temporarily substantially blocking, at an end face, an open end of each of said cells not in said subset.

2. In a method of bulk charging a flowable material into a selected subset of cells of a honeycomb structure having a pair of opposing open end faces and a matrix of thin walls defining a multiplicity of hollow, open ended cells extending through said structure between said pair of end faces, the improvement comprising the step of:
   a removably inserting a preformed plug, at an end face, into and to temporarily substantially block an open end of each of said cells not in said subset.

* * * * *